United States Patent [19]
Mulhern

[11] 3,935,837
[45] Feb. 3, 1976

[54] PET FEEDER

[76] Inventor: Philip J. Mulhern, 67 Sanford Pl., Fairlawn, N.J. 07470

[22] Filed: Jan. 8, 1975

[21] Appl. No.: 539,518

[52] U.S. Cl. .............................................. 119/51.12
[51] Int. Cl.² ............................................. A01K 5/00
[58] Field of Search ........... 119/51.12, 51.14, 51.15, 119/51.11

[56] References Cited
UNITED STATES PATENTS

| | | | |
|---|---|---|---|
| 2,157,682 | 5/1939 | Sweeny | 119/51.12 |
| 2,752,995 | 7/1956 | Dodge | 119/51.12 |
| 3,532,075 | 10/1970 | Cooper | 119/51.12 |
| 3,631,840 | 1/1972 | McCormack | 119/51.12 |

*Primary Examiner*—Hugh R. Chamblee
*Attorney, Agent, or Firm*—Ralph R. Roberts

[57] ABSTRACT

This invention pertains to a pet feeding device for cats, dogs and the like. The feeder base retains a feeding dish or tray. A timing device opens the cover of the feeding dish or tray at a preselected time. The tray is removably secured to a floor or wall and a hinged cover is actuated by tension springs providing means for opening the device to uncover a dish by a timing mechanism. This mechanism is selectively set by the owner or attendant to provide the animal with food or water, or both, at a determined time period, for example, eight or twelve hours. The cover and base are provided with a seal and preferably are insulated so that the moisture in the pet food or the aroma of the food cannot escape. Insulation also insures that the pet food does not spoil during the time it is stored within the timed release feeding device prior to its being released and made available for the feeding of the animal. The timer and the container are configured and constructed so that a chewing or biting attach by the pet or animal will result in no damage to the feeder and also prevents the release of the cover until a trigger release has been actuated by the timing mechanism.

11 Claims, 7 Drawing Figures

PET FEEDER

BACKGROUND OF THE INVENTION

1. Field of the Invention

In reference to the classification of art as established by the United States Patent Office the present invention pertains to the class entitled, "Animal Husbandry" (Class 119) and more particularly to the subclass pertaining to "feeding devices — timer controlled" (subclass 51.11).

2. Description of the Prior Art

The inconvenience of feeding a pet at timed intervals when the owner or attendant is not available at the usual feeding time is usually a worry to the owner or attendant and alternate feeding arrangements must often be made. Usually these feeding arrangements require the owner to temporarily board the pet in a veterinary or kennel or perhaps the animal may have to be deprived of food and/or water for a short period of time.

The prior art devices show many types of feeders wherein one or more pets may be accommodated and it is known that electrically operated feed releasing devices are available. Pet feeders which are completely portable and may be releasably secured to floors or to a wall bracket, which have internal mechanisms which may be exteriorally set for a timed release and in which the devices are small, compact and contoured to defeat attack by the pet, is to the best of the applicant's knowledge not known.

Applicant in the present invention proposes to provide a pet feeder which may be made in various sizes and which during a selected time span, as for example, 12 hours will have the cover released by a spring-actuated mechanism to expose one or two containers of pet food and/or water for the feeding of the animal during the absence of the owner. Today where guard dogs are particularly used to patrol premises during night hours and over weekends it is only humane that the animals receive a proper ration at proper intervals. For example, if a pet feeder is set to be released after 8 hours, a midnight or early morning feeding of the animal may be provided without an attendant coming to the premises to feed the animal. With many of todays prepared pet foods being particularly susceptible to exposure to air, heat and the like it is also desirable and necessary that the pet feeder, such as provided in this invention, be sealed to prevent unwanted drying of the food product and also that the device be insulated so that unwanted heating or cooling of the food product does not occur during the few hours that the pet feeder is closed after it is stocked by the attendant.

SUMMARY OF THE INVENTION

This invention may be summarized at least in part with reference to its objects.

It is an object of this invention to provide, and it does provide, a pet feeder having a reservoir for the storing therein of food and the like for the subsequent feeding of a pet or animal. The cover has a spring and when the cover is closed the contents of the receptacle are more-or-less pneumatically sealed and in response to the timing actuation selectively set by the user of the feeder, the feeder cover is caused to spring open to expose the contents of the feeder for use by the animal at the selected time period.

It is a further object of this invention to provide, and it does provide, a pet feeder which in addition to being selectively opened in response to a timing signal set by the user, owner or attendant additionally has an insulating means which maintains the contents of the feeding dish at a satisfactory temperature and condition for the use of the pet or animal at the established time of opening of the feeder.

The feeder of this invention essentially consists of a base and a spring-hinged cover. The base carries a timer and a latching mechanism which is responsive to the manual setting of the time by the user of the pet feeder. The base of the feeder is releasably mounted into and on a bottom member secured to the floor or, if desired, attached to a wall. The feeder and the several components that provide enclosing portions thereof are contoured so as to eliminate shoulders or protrusions which may be susceptible to the teeth of the animal or pet for which the feeder is to be used. Additionally the feeder is provided with thermal insulating means and also sealing means which maintain the contents of the feeding dish both to prevent unwanted moisture escape but also to prevent overheating or cooling resulting in spoilage.

In addition to the above summary the following disclosure is detailed to insure adequacy and aid in understanding of the invention. This disclosure, however, is not intended to limit the purpose of the patent which is to cover the inventive concept no matter how later disguised in variations in form or additions. For this reason there has been chosen a specific embodiment for a pet feeder for use with a single dish and an alternate pet feeder showing multiple dishes and in addition both manual and electrical trigger releasing mechanisms. These specific embodiments have been chosen for the purpose of illustration as shown in the accompanying drawings wherein:

BRIEF DESCRIPTION OF THE DRAWINGS

In the following description and in the claims various details will be identified by specific names for convenience. These names, however, are intended to be generic in their application. Corresponding reference characters refer to like members through out the several figures of the drawings.

Figure 1:
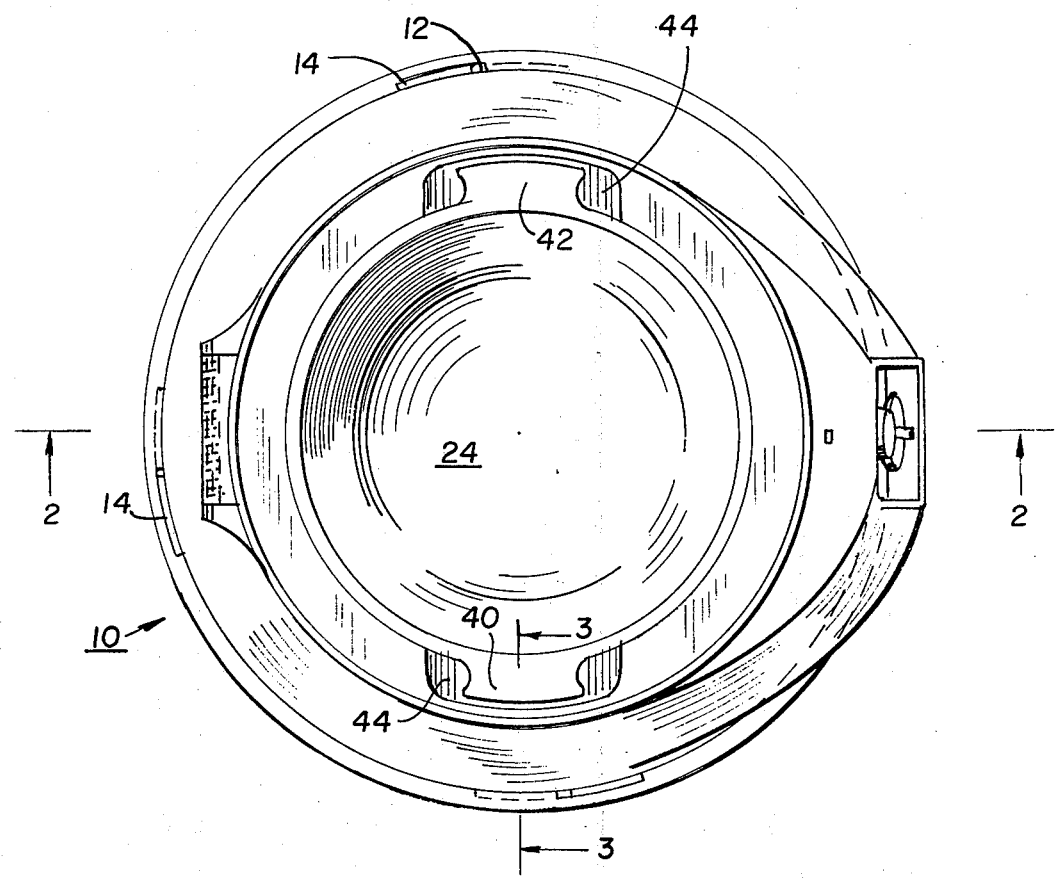
FIG. 1 represents a plan view looking downward on the base of the feeder, this view being taken on the line 1—1 of FIG. 2 and looking in the direction of the arrows.

The drawings accompanying assist in disclosing applicant's invention and may be altered as required to provide configurations providing the same result.

DESCRIPTION OF THE PREFERRED EMBODIMENT OF FIGS. 1 — 5

Referring now in particular to the drawings in which is shown the details of the pet feeder of FIGS. 1 through 5, there is depicted a feeder in which a base member 10 which may be of molded plastic or metal and which has on its bottom locking lugs 12, these lugs entering into complementary slots 14 formed in a retaining bottom 16 which is exemplified as an auxiliary member. Bottom 16 has formed on its upper surface a series of protrusions 18 which act as spacers to support the inner portion of the base member 10. The interior of this base member is preferably filled with a foamed plastic which provides insulation and this foam may be polyutherane foam, and as secured to the inside of the base 10 is identified as 20. The interior surface of this insulation is contoured to provide an inner recess 22 which contoured recess receives and retains a plastic cup 24 in which the food or drink for the animal to be serviced is normally retained. In the foreportion of the base member 10 and also in the insulating material 20 is formed recess 26 in which is mounted a timer and a latching mechanism to be hereinafter more fully disclosed.

At the rear portion of the base and at its upper surface there is formed one-half of a hinge, this hinge forming the lower half of the hinge generally identified as 28. This hinge is retained in pivoted condition by a pin 30 which also passes through the complementary hinge portion of the rear cover 32. This cover 32 has its inside area also provided with a thermal insulating portion 34 which also may be of inexpensive polyutherane foam. Spring 36 is arranged to seat within appropriately formed portions of the hinge 28 and is mounted on hinge pin 30 and in its operable condition is adapted to urge the cover 32 to an open condition. When in an unlatched condition the cover usually attains an attitude of sixty degrees or more.

Figure 2:
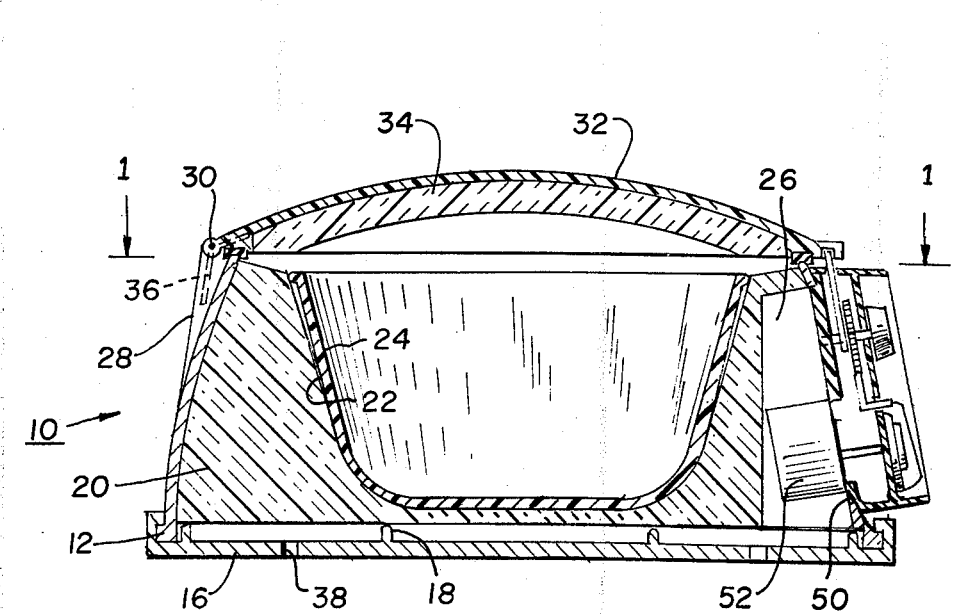
FIG. 2 represents a side view of the sectional side view of the feeder with this view taken on the line 2—2 of FIG. 1 and looking in the direction of the arrows.

Also to be noted in FIG. 2 is the presence of apertures 38 in the bottom retaining plate 16. These apertures or holes are for the purpose of utilizing screws by which member 16 is secured to the floor or a shelf bracket to insure that the closed container is not dislodged from its mounted condition by the pushing or nudging of the unattended pet or animal.

Figure 3:
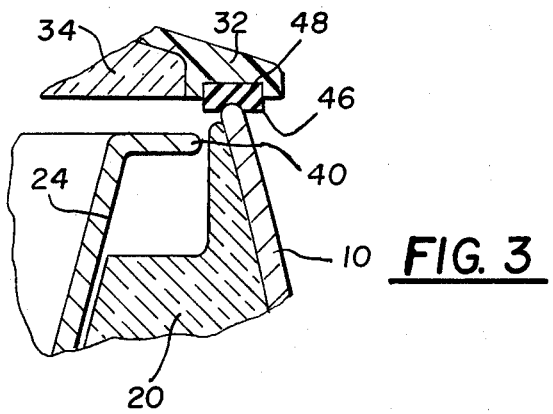
FIG. 3 represents a sectional side view in an enlarged scale, this view taken on the line 3—3 of FIG. 1 and showing in detail the preferred arrangement of the sealing means located between the cover and base.

Container Seal as Seen in FIG. 3

Referring next to the enlarged view as seen in FIG. 3, it is to be noted that carried in the cover 32 is a rubber ring 46 which is retained in a groove recess 48 formed in this cover. Ring 46 may be retained in this groove by means of a suitable adhesive or a pressure-type fit. It is anticipated that this ring if made of rubber might have a durometer of approximately 35 or 40 to provide an easy seal during the long periods of time the cover may be in a latched condition. As and when the cover 32 is in a latched condition this seal engages the upper and lower edges of the base to pneumatically seal the contents of the container 24.

Figure 4:
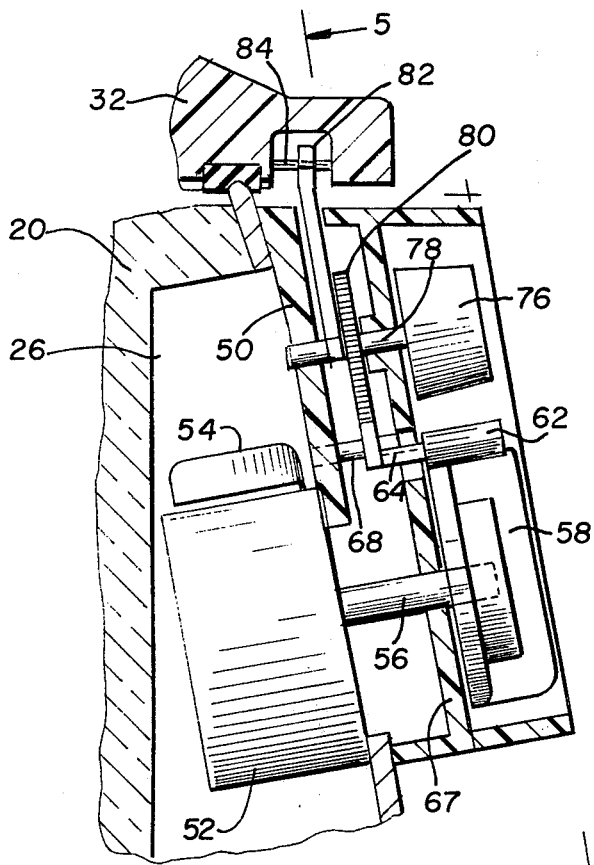
FIG. 4 represents in an enlarged view a fragmentary side sectional view showing the arrangement of the timer and the latching mechanism proposed for use with a mechanical timer.
Figure 5:
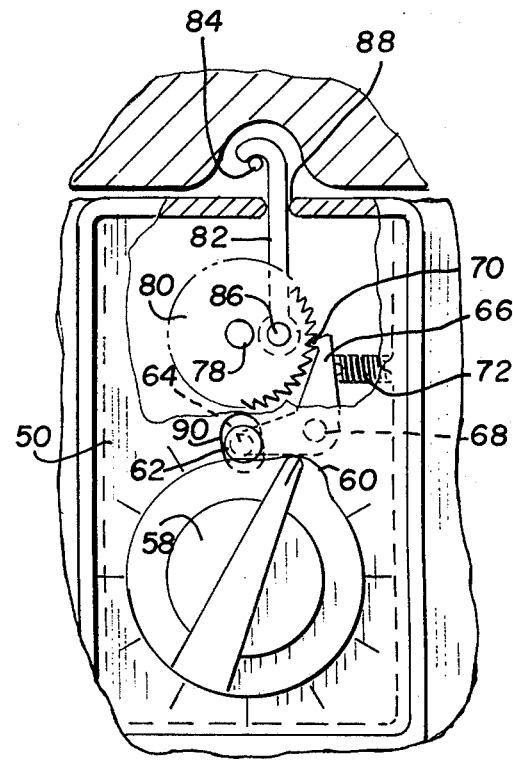
FIG. 5 represents a front view of the mechanism shown in FIG. 4 with this fragmentary view being taken on the line 5—5 of FIG. 4 and looking in the direction of the arrows.

Timing and Latching Mechanism of FIGS. 4 and 5

Referring next to the fragmentary views shown in FIGS. 4 and 5, it is to be noted that a timer support plate 50 is secured to the front portion of the base 10. This means of securing may be by means of screws, glue or the like. This plate 50 preferably carries a timer 52 which, if desired, may also have a bell 54 associated with this actuation. Timer shaft 56 extends through a front cover portion 57 which forms a portion of the timing mechanism. Carried on this timer shaft 56 is a pointer member 58 preferably having a cam lobe 60 formed as part of its peripheral design. A roller 62 is urged into engagement with the periphery of the pointer 58 and is displaced from its at rest position by the movement of the cam portion 60 when the timer has been turned to its zero or off position.

Roller 62 is carried on one end of a pawl or ratchet arm 66 which is pivotedly carried by means of an axle 68 in the upper plate 50 and front cover portion 57. Roller 62 is carried on shaft 64 secured to the ratchet arm 66. This arm 66 has on its other end a ratchet engaging tube 70 which is best seen in FIG. 5. A spring 72 is mounted on a molded pin carried by the timer plate and has its leftward or inner end adapted to engage the ratchet arm 66 to urge it counterclockwise around the shaft 68 as seen in FIG. 5. A setting knob 76 carried on shaft 78 rotates the ratchet wheel 80. Ratchet wheel 80 carries one end of a hook member 82 whose upper distal end is disposed to engage hook pin 84. The hook member 82 is carried by a pin 86 which acts as a pivoted or crank pin and is mounted in the ratchet wheel 80. Hook 82 is guided by a slot 88 formed in the upper part of the timer support plate or housing and as the hook member 82 is moved up and down by the crank pin 86 the hook is not only raised and lowered but also moves in a slight arc. This latching action will be hereinafter more fully described in conjunction with the use of the pet feeder. Slot 90 formed in the front cover portion 57 permits the rocking back and forth or the raising up and down of the roller 62 as the ratchet arm 66 is moved back and forth around the pin or shaft 68.

Description of the Alternate Embodiment

FIG. 6

Figure 6:
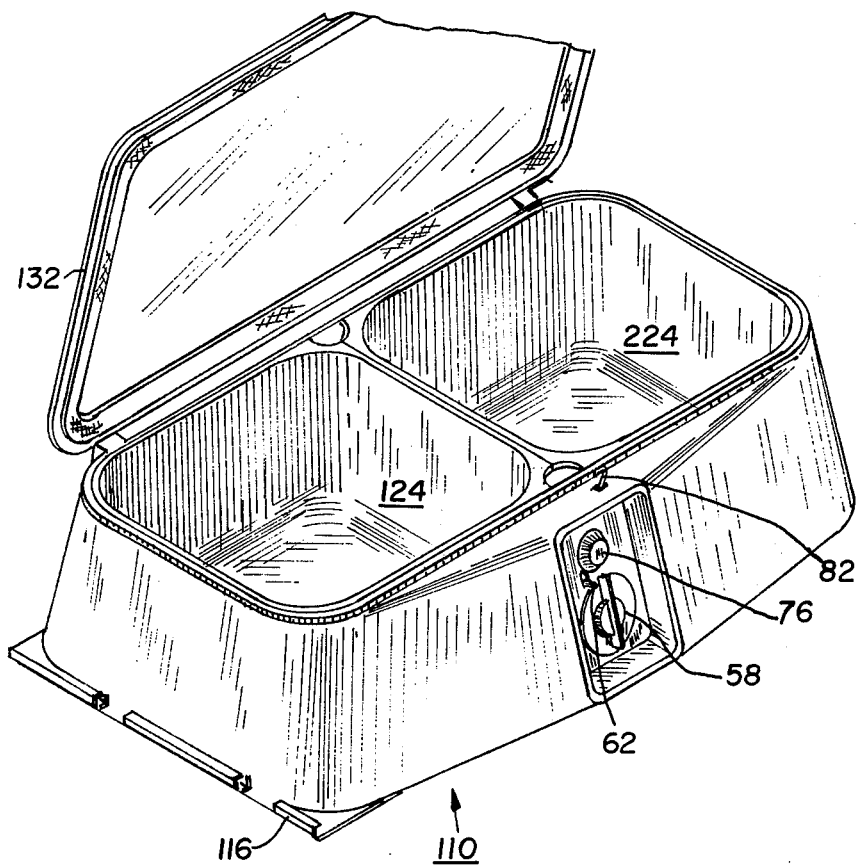
FIG. 6 represents an isometric view of an alternate feeder in which two compartments are provided, one compartment perhaps for the use of drinking water and the other for food.

Referring now to the embodiment shown in FIG. 6, there is depicted a feeding apparatus similar to that in FIG. 1 except that a dual compartment is shown. In this embodiment a base 110 similar to that of a base 10, seen in FIG. 1, is removably mounted in clips formed on a bottom plate 116. In this base member feeding trays 124 and 224 are mounted in recesses formed in the insulating portion filling the cavity of this base member. Carried by this base member and on hinges provided therewith is a cover 132 which is supported by hinges mating with the portion on the base. As in the example of FIG. 2, spring-biasing means such as by springs 36 cause this cover to be moved to an open condition except and as the cover is latched into retaining condition by means of a hook member 82. The timer bell and setting knob as well as the pointer knob 58 at least are similar to those as seen in FIGS. 1 through 4. FIG. 6 has recesses formed for the retaining of the timer mechanism so that the animal cannot reach the components by the use of the teeth or claws.

Figure 7:
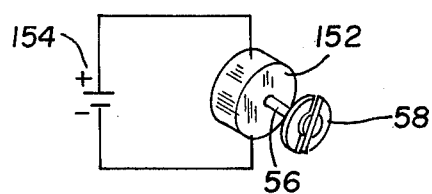
FIG. 7 represents a circuit diagram of a motor operated timer which might be utilized in this feeder with the motor operated by a battery or other electrical source.

Timing Mechanism of FIG. 7

Referring finally to the embodiment as seen in FIG. 7, there is shown an alternate arrangement of a timer mechanism. As shown, an electric timer motor 152 having an output shaft 56 upon which is mounted a timer knob 58 is driven by a battery 154. This battery is preferably self contained within the base 110 or the base 10.

Whether the battery is a disposable battery or is a rechargeable battery is merely a matter of selection and, of course, the battery could be supplemented by the use of house current. However, an exposed electrical cord running to such a device with the potential shock that an animal might receive in chewing the core when or if attempting to open the device is certainly an undesirable feature.

Use and Operation of the Feeding Device of FIG. 6

In both the single and multicontainer feeding device it is contemplated that the feeding dish 124 and 224 may be readily removed from the recess provided in the contour of the filling portion of the base member. These contoured inner surfaces are so designed that the dishes may not be easily removed or nudged from their position by an animal for which the trays are to be used. As shown, the top surface and lifting ear portions of these feeding dishes are contemplated to be a slight distance below the top edge of the base member. Both cover 32 and 132 are spring biased to an open position and after the dishes have been filled to the desired level the cover 32 or 132 is pushed downward into a seating condition and a small compression of the rubber gasket is made so that a seal of the contents of the dishes is achieved.

The desired amount of time delay for which the pet feeder is to be set is now established by the owner and before the cover is closed the pointer knob 58 is set to the desired time interval. The cover is now pushed into the desired seating condition and the knob 76 is turned clockwise to cause the hook end of member 82 to engage the pin 84 and retain the cover in this desired closed condition. The ratchet engaging tooth 70 is urged by spring 72 into a latch retaining condition and in this manner the cover is maintained in closed condition. At this time or prior to the closing of the cover the base member 10 or 110 is releasably secured to the bottom plate 16 or 116 so that the feeding dish apparatus is secured to the floor or wall and accidental or intentional dislodgement by the pet or animal to be fed is defeated. If the owner wishes to check the contents of the pet feeder and to open the cover without disturbing the setting of the timer, the owner need only manipulate the roller 62 against the spring bias 72 to cause the latch engaging tooth 70 to be disengaged from the ratchet. The spring-bias cover will then open by this manual manipulation enabling the contents of the dish to be examined and relatching of the cover simply requires pushing the cover into position and again moving knob 76 into the hook closing condition. This, of course, will not require a resetting of the timer to a new time period unless desired by the owner.

In the above embodiments only a single or a dual container has been shown since this is contemplated to provide the most desirable arrangement, however, if more latch covers and more containers are desired multiples of the above-described embodiment may, of course, be provided.

Whether the base member is made of metal or plastic and the insulation to provide and maintain the food content at or near its optimum condition is made of plastic is merely a matter of selection. It is desirable, however, that the latching mechanism be inexpensive and substantially foolproof and be easily manipulated by the owner without elaborate instructions. Since the power required to operate the timer must be either a clock spring or an electrical source such as a battery it is desired that the latching mechanism be easily operated through a mechanical advantage such as is provided in the above-described embodiment.

It is contemplated that various sizes of the feeders may be provided since obviously the capacity and requirements of pets vary as to their size and whether they are cats or dogs.

Terms such as "up," "down," "in," "out," "clockwise" and "counterclockwise" and the like have been used merely for the purpose of description and not as a particular means in which the pet feeder may be constructed or used. These terms are merely for the purpose of convenience and no restrictive significance is placed upon there use.

While the above embodiments have been described in a rather detailed fashion, variations in configuration, form or materials may, of course, be made without departing from the concept of the invention. This invention is to be accorded the scope as established by the following claims in light of the known prior art.

What is claimed is:

1. A pet feeder having at least one food container of selected size and having a cover which is movable from a normally open condition to a latched closed condition until released by a timing means, said feeding including: (a) a base; (b) means for removably securing said base to a floor, wall and the like; (c) a cover hingedly connected to said base; (d) biasing means for urging said hinged cover to a selected open condition above said base; (e) sealing means interposed between the cover and base so as to provide substantially a hermetic seal of the feeder when the cover is in closed condition; (f) a feeding dish carried by said base and when in seated condition in the base and said cover is in latched condition the dish contents are in sealed condition; (g) a hook pin carried by the cover and a hook member carried by the base member and at a position substantially opposite the hinge portion thereof, said hook member having one end formed with a hook and the other end pivotally carried on a pin secured to a ratchet wheel rotatably mounted on an axle carried by the base, this pin radially displaced from the axle so as to act as a crank pin as the ratchet wheel is rotated, said ratchet wheel restrained from moving in a direction to lift the hook member by the engagement of a ratchet engaging tooth carried by a pawl arm; (h) means for selectively establishing and retaining said hook member in pin retaining condition; (i) a timer and a cam means operatively associated with said timer, this cam means at the conclusion of the timer cycle moving the pawl member to disengage the hook member from the pin to release the cover which is then opened by the bias means, and (j) means for releasing the latched cover for inspection of the contents of the dish at a period in time which is prior to the original time set on the timer.

2. A pet feeder as in claim 1 in which the means for removably securing the base to the floor includes a bottom plate adapted for securing to a floor, wall and the like, said bottom plate having lugs which cooperatively engage mating means formed on the base.

3. A pet feeder as in claim 1 in which the inner portions of the base and cover have insulating means by which the temperature condition of material in the feeding dish is extended.

4. A pet feeder as in claim 3 in which the insulating means is a foamed plastic.

5. A pet feeder as in claim 1 in which the timer and cam means includes a timer which is moved to a determined time period by a pointer knob, and moved with said knob is a cam which reaches a fixed position when the timer reaches zero time, said cam engaging means on the pawl arm and moving the arm causing the ratchet engaging tooth to disengage and release the ratchet wheel.

6. A pet feeder as in claim 5 in which the means on the pawl arm that is engaged by the cam is a roller which is disposed so as to permit manipulation and the resulting release of the cover for inspection prior to the release by the timer.

7. A pet feeder as in claim 6 in which the pawl arm is spring biased into ratchet wheel engaging condition and there is provided a hook arm guide which engages the midlength of said arm to provide a swinging locking and unlocking of the hook in response to the movement of the ratchet wheel.

8. A pet feeder as in claim 7 in which the shaft carrying the ratchet wheel is extended and on this shaft is mounted a setting knob which is rotated to cause the ratchet wheel and the pivotally mounted hook arm to be moved to move the hook to a determined amount for pulling the cover into a sealing condition.

9. A pet feeder as in claim 1 in which a plurality of feeding dishes are removably secured in the base, and in which these dishes are covered by a single cover.

10. A pet feeder as in claim 1 in which the timer is a spring-powered mechanism.

11. A pet feeder as in claim 1 in which the timer is an electrical mechanism driven by a source of electrical energy.

* * * * *